(12) United States Patent
Ye

(10) Patent No.: US 8,780,585 B2
(45) Date of Patent: Jul. 15, 2014

(54) DOUBLE PHASE-SHIFTING FULL-BRIDGE DC-TO-DC CONVERTER

(75) Inventor: Zhong Ye, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 314 days.

(21) Appl. No.: 12/848,110

(22) Filed: Jul. 31, 2010

(65) Prior Publication Data
US 2012/0026754 A1 Feb. 2, 2012

(51) Int. Cl.
- *H02M 3/335* (2006.01)
- *H02M 3/24* (2006.01)
- *H02M 3/28* (2006.01)

(52) U.S. Cl.
CPC .................................. *H02M 3/285* (2013.01)
USPC ............................................ 363/17; 363/98

(58) Field of Classification Search
USPC ........ 363/15, 16, 17, 19, 21, 1, 23, 36, 56.01, 363/71, 98
See application file for complete search history.

(56) References Cited

U.S. PATENT DOCUMENTS

| | | | |
|---|---|---|---|
| 5,862,041 A * | 1/1999 | Martin | 363/71 |
| 6,054,674 A * | 4/2000 | Moriguchi et al. | 219/130.21 |
| 6,574,125 B2 * | 6/2003 | Matsukawa et al. | 363/71 |
| 6,999,328 B2 * | 2/2006 | Lin | 363/71 |
| 7,683,587 B2 * | 3/2010 | Inaba et al. | 322/20 |
| 2009/0196072 A1 | 8/2009 | Ye | |
| 2010/0277408 A1 * | 11/2010 | Willaert et al. | 345/102 |

OTHER PUBLICATIONS

Application Note, Andreycak, "Phase Shifted, Zero Voltage Transition Design Considerations and the UC3875 PWM Controller," U-136A, Unitrode (Texas Instruments Incorporated), Dallas, TX, USA, 1999.
Datasheet, UCC1895, UCC2895, UCC3895, "BiCMOS Advanced Phase-Shift PWM Controller," Texas Instruments Incorporated, Dallas, TX, USA Dec. 1999—Rev. Apr. 2010.

* cited by examiner

*Primary Examiner* — Matthew Nguyen
*Assistant Examiner* — Trinh Dang
(74) *Attorney, Agent, or Firm* — William B. Kempler; Frederick J. Telecky, Jr.

(57) ABSTRACT

A DC-to-DC converter has a leading full-bridge inverter and a lagging full-bridge inverter for receiving a DC input and producing respective AC output voltages. A full-wave rectifier circuit rectifies the AC output voltages to produce a rectified output voltage, which is filtered by a current doubling output filter circuit to produce a DC output voltage. A master phase-shift controller and a slave phase-shift controller respectively provide first and second control signals to the leading full-bridge inverter and third and fourth control signals to the lagging full-bridge inverter to regulate the DC output voltage by changing a phase of the second and fourth control signals with respect to the first and third control signals below a predetermined DC output voltage, and by changing a phase of the third and fourth control signals with respect to the first and second control signals above the predetermined threshold.

20 Claims, 4 Drawing Sheets

DOUBLE PHASE-SHIFTING FULL-BRIDGE DC-TO-DC CONVERTER

CROSS-REFERENCE TO RELATED APPLICATIONS

This application is related to copending U.S. patent application Ser. No. 12/315,166 filed Nov. 28, 2008, which claims priority from U.S. provisional patent application No. 61/005, 163, filed Dec. 3, 2007, both of which are assigned to the assignee hereof and incorporated herein by reference in their entireties.

BACKGROUND

1. Field

This various circuit embodiments described herein relate in general to power converters, and, more specifically, to double phase-shifting full-bridge DC-to-DC power converters having capabilities and advantages of the type described which can be controlled with phase-shifting signals, with a wide-range of zero-voltage-switching (ZVS), and with substantially no circulating currents.

2. Background

In the field of power conversion, it is a common practice to convert electrical energy from one DC voltage level to other isolated DC voltage levels using high frequency switching technology. The use of switching technology dramatically decreases the size of power converters and improves power conversion efficiency. While enjoying the benefits of switching technology, industry is also facing new challenges, including further demands of higher power conversion efficiency, smaller converter size requirements, and lower electromagnetic inference (EMI) emission requirements that are caused by switched currents and voltages.

In order to improve converter efficiency, reduce the size of converters, and minimize EMI, tremendous efforts have been made to achieve wide-range zero voltage switching (ZVS), eliminate circulating currents, perform energy recovery associated with reverse recovery of output diode, and eliminate or clamp voltage ringing of the output diodes. Although a lot of effort has been expended, no comprehensive solution known to the applicant has been achieved that has a wide-range ZVS capability, always operates at maximum duty cycle, fully utilizes magnetic components, minimizes or eliminates circulating current, performs reverse energy recovery, and clamps or eliminates the voltage ringing at output diodes.

What is needed is a DC-to-DC converter and control method with topology that can operate at a constant 50% duty cycle with a regulated output voltage. Also, what is needed is a control method and topology that can improve peak efficiency and light load efficiency at the same time, without having to switch between PWM and phase-shift control signal modes.

SUMMARY

A double phase-shifting full-bridge DC-to-DC converter is described based on the dual half-bridge DC-to-DC converter described in parent U.S. patent application Ser. No. 12/315, 166 filed Nov. 28, 2008 cited above. The full half-bridge DC-to-DC converter, however, eliminates mode switching between phase-shifting and PWM control signal modes and uses only phase-shifted control signals. The double phase-shifting full-bridge DC-to-DC converter maintains soft switching over a wider output voltage and load ranges while achieving the same peak efficiency, with improved efficiency at light load. It also maintains soft switching over wider load and output voltage regulation ranges. The two inverters of the double phase-shifting full-bridge DC-to-DC converter can work alone for single full-bridge control or provide two interleaved phase-shifting full-bridges for higher efficiency and higher power applications.

Thus, in accordance with a DC-to-DC converter embodiment described herein, first and second full-bridge inverters receive a DC input, and a full-wave rectifier circuit combines their outputs to produce a DC output. A controller provides control signals to the first and second full-bridge inverters with respective phases dependent upon a DC voltage output. The controller regulates the DC output only by controlling respective phases of the control signals.

In accordance with another DC-to-DC converter embodiment, a leading full-bridge inverter and a lagging full-bridge inverter receive a DC input and produce respective AC output voltages. A full-wave rectifier circuit rectifies the AC output voltages to produce a rectified output PWM voltage, which is filtered by a current doubling output filter circuit to produce a DC output voltage. A master phase-shift controller and a slave phase-shift controller respectively provide first and second sets of control signals to the leading full-bridge inverters and third and fourth sets of control signals to the leading full-bridge inverter. The master and slave phase-shift controllers regulate the DC output voltage by changing a phase of the second and fourth sets of control signals with respect to the first and third sets of control signals below a predetermined DC output voltage, and by changing a phase of the third and fourth sets of control signals with respect to the first and second sets of control signals above the predetermined DC output voltage.

In accordance with yet another DC-to-DC converter embodiment, a first full-bridge inverter has first and second current paths for producing a first AC output voltage in response to a DC input voltage. A second full-bridge inverter has third and fourth current paths for producing a second AC output voltage in response to the DC input voltage. A full-wave rectifier circuit receives the first and second AC output voltages to produce a rectified PWM output voltage that is filtered by a current doubling output filter circuit to produce a DC output voltage. A first phase-shift controller receives the DC output voltage as a feedback signal and provides a set of first control signals to the first current path and a set of second control signals to the second current path. A second phase-shift controller receives the DC output voltage feedback signal from first phase-shift controller and provides a set of third control signals to the third current path and a set of fourth control signals to the fourth current path. To regulate the DC output voltage, when the DC output voltage is below a predetermined threshold voltage the first phase-shift controller controls a phase of the second set of control signals with respect to a phase of the first set of control signals in proportion to the DC output voltage. When the DC output voltage is above the predetermined threshold voltage the first phase-shift controller maintains the second phase to be 180 degrees out of phase with the first phase. When the DC output voltage is below the predetermined threshold voltage the second phase-shift controller controls a phase of the third and fourth sets of control signals to be substantially the same as the first and second phases. When the DC output voltage is above the predetermined threshold voltage the second phase-shift controller controls a phase of the third and fourth set of control signals in proportion to the DC output voltage with respect to the first and second phases.

Since the control signals of both the leading and lagging full-bridge inverters are phase-shifted (without a PWM control requirement) in a different manner above and below the predetermined threshold voltage, the DC-to-DC converter is referred to herein as a "double phase-shifting, full-bridge DC-to-DC converter." The double phase-shifting full-bridge DC-to-DC converter circuit improves the peak efficiency of the converter and improves the light load efficiency with a control scheme that interleaves two single full-bridge DC-to-DC converters. This eliminates circulating power, a barrier to improving the peak efficiency of a full-bridge converter. This topology and control allows part of the circuit to be turned off at light load, decreases circuit switching loss, and boosts the efficiency of the circuit. If the two controller circuits are connected in master and slave configuration, the resulting controller can control a single phase-shifting full-bridge or two interleaved phase-shifting full-bridges.

BRIEF DESCRIPTION OF THE DRAWINGS

In the various figures of the drawing, like reference numbers are used to denote like or similar parts.

DETAILED DESCRIPTION

Figure 1:
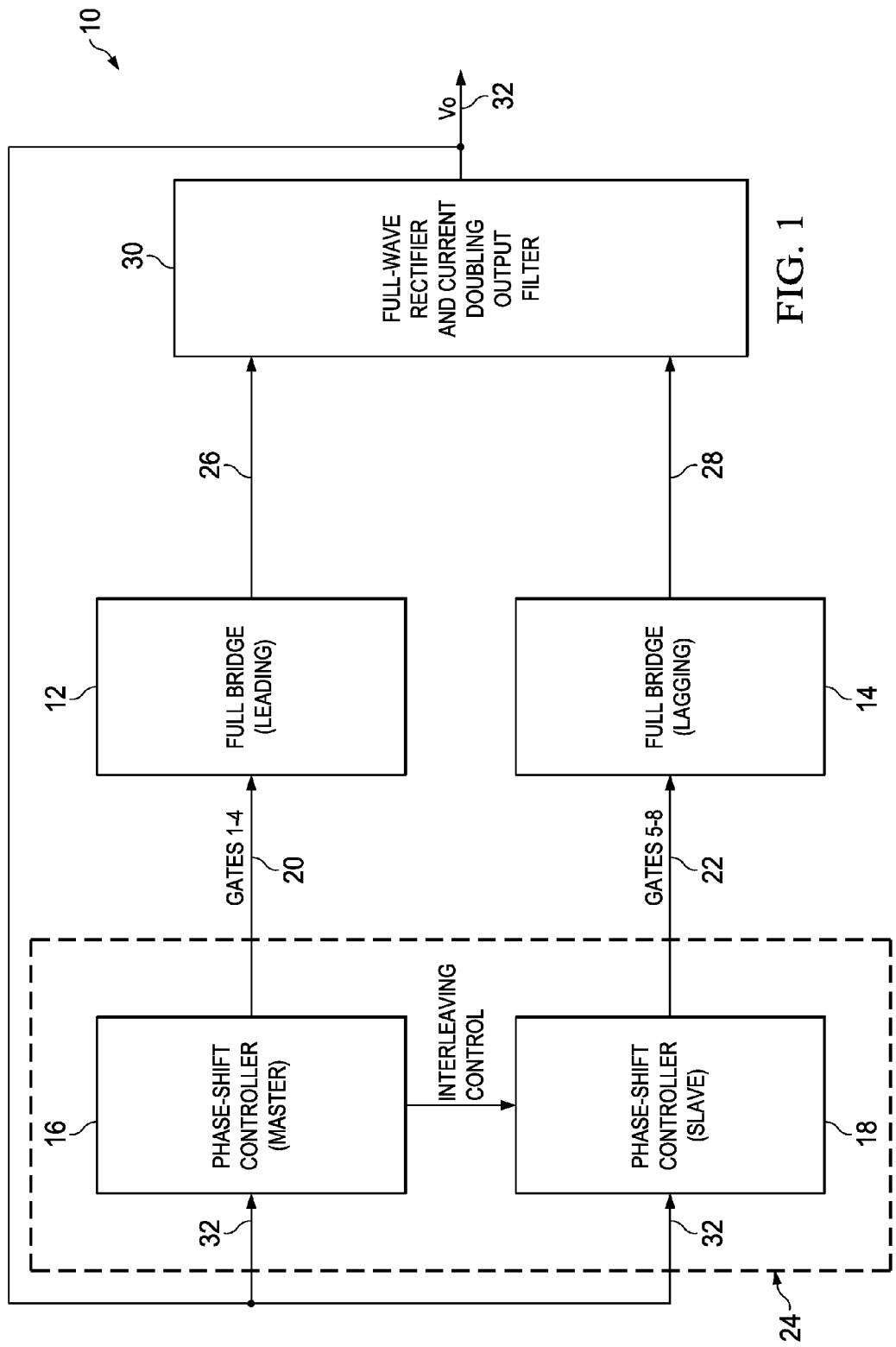
FIG. 1 is a block diagram of a double phase-shifting full-bridge DC-to-DC converter embodiment.

A block diagram of an embodiment of a double phase-shifting full-bridge DC-to-DC converter 10 is shown in FIG. 1, to which reference is now made. The double phase-shifting full-bridge DC-to-DC converter 10 includes first and second full-bridge inverters 12 and 14, the first full-bridge inverter 12 sometimes being referred herein to as a leading full-bridge inverter or as a master full-bridge inverter, and the second full-bridge inverter 14 sometimes being referred to herein as a lagging full-bridge inverter or a slave full-bridge inverter, described below in detail.

The leading and lagging full-bridge inverters 12 and 14 each have four switching transistors, Q1-Q4 and Q5-Q8, respectively, (shown in FIG. 2 below) which are controlled by gate control signals developed by the master and slave phase-shift controllers 16 and 18 on respective gate signal lines 20 and 22. It should be noted that although two separate phase-shift controllers 16 and 18 are shown, denoted as master and slave phase-shift controllers, the control functions may be incorporated into a single unit, represented by the dotted line box 24.

The leading and lagging full-bridge inverters 12 and 14 develop respective AC output voltages on lines 26 and 28, which are rectified and filtered by a full-wave rectifier circuit and current doubling output filter 30. The DC output voltage, Vo, is developed on output line 32, which is sensed and fed back to the master and slave phase-shift controllers 16 and 18 to regulate the DC output voltage, Vo, as described below in detail. Another control scheme (not shown) is to provide the DC output voltage, Vo, to the master phase-shift controller 16 as a feedback signal, with the master phase-shift controller 16 providing a compensator output and synchronous signal to the slave phase-shift controller 18 for regulation of the DC output voltage, the goal being to develop the control waveform sets described below.

Figure 2:
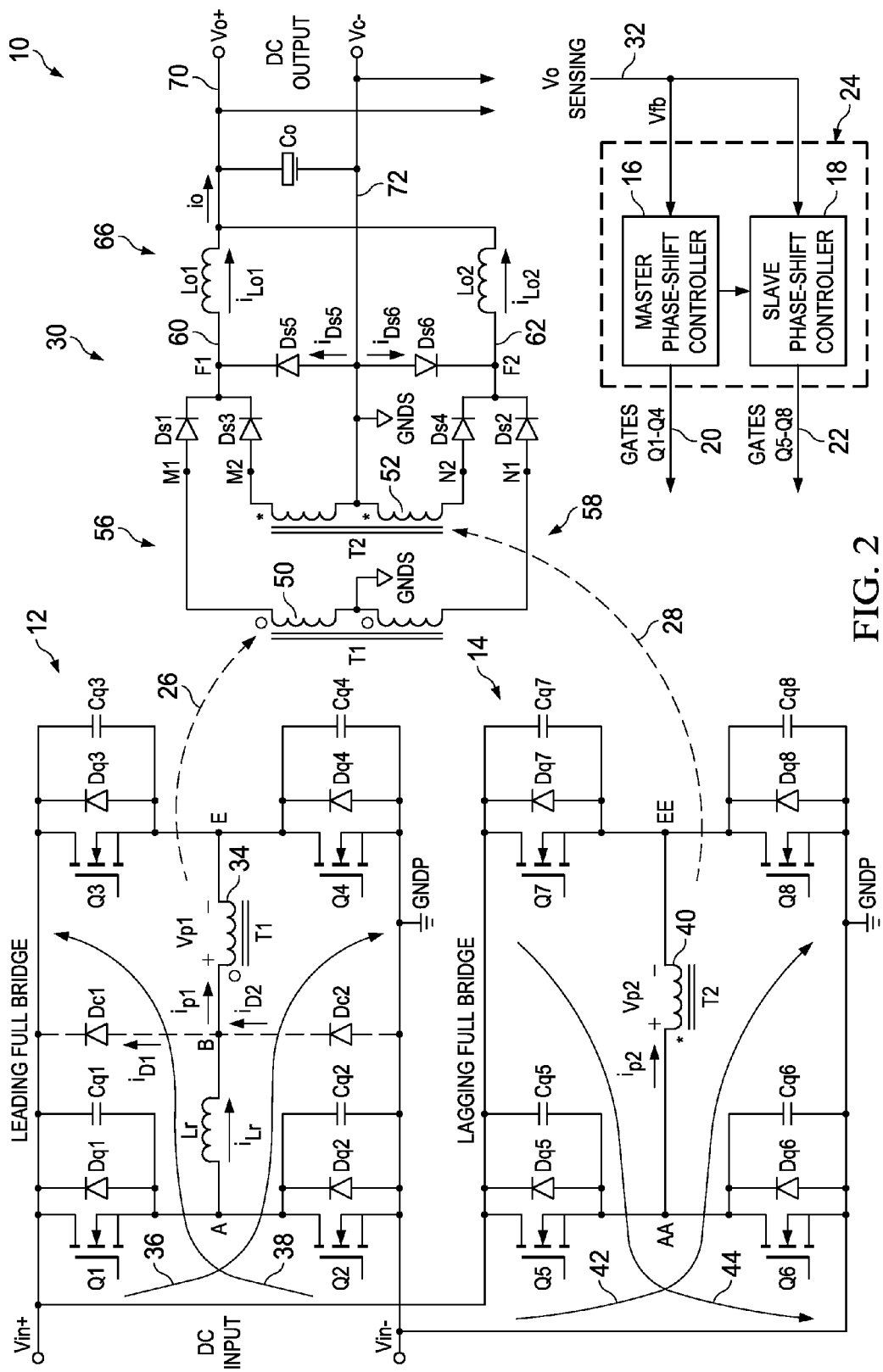
FIG. 2 is an electrical schematic diagram of a portion of the double phase-shifting full-bridge DC-to-DC converter embodiment of FIG. 1.

A schematic diagram of an embodiment of the double phase-shifting full-bridge DC-to-DC converter 10 of FIG. 1 is shown in FIG. 2, to which reference is now additionally made. The leading and lagging bridge inverters 12 and 14 of the double phase-shifting full-bridge DC-to-DC converter 10 are both connected to a DC source by DC input terminals Vin+ and Vin−. The DC input terminal Vin+ is the positive input connected to the positive terminal of the DC source, and the DC input terminal Vin− is the negative input connected to the negative terminal of the DC source, which may be at a reference potential, or primary-stage ground (GNDP).

The leading full-bridge inverter 12 has a first pair of MOSFET (metal-oxide silicon field-effect transistor) power switches Q1 and Q2 cascaded together at node A in series between the DC input terminals Vin+ and Vin−. In a similar manner, the leading full-bridge inverter 12 also has a second pair of MOSFET power switches Q3 and Q4 cascaded together at node E in series between the DC input terminals Vin+ and Vin−. Although the power switches herein are described as MOSFET devices, IGBTs (isolated gate bipolar transistors), or other types of semiconductor switching devices may be equally advantageously employed.

The diodes Dq1 and Dq2 shown in FIG. 2 are the body diodes of the power switches Q1 and Q2, respectively. A pair of capacitive elements Cq1 and Cq2, whose values include the parasitic capacitance of the power switches Q1 and Q2, as well as any external capacitances that are connected across the power switches Q1 and Q2, respectively. Likewise, the diodes Dq3 and Dq4 are the body diodes of the power switches Q3 and Q4, respectively, and the capacitive elements Cq3 and Cq4 have values which include the parasitic capacitance of power switches Q3 and Q4, as well as any external capacitances that are connected across the power switches Q3 and Q4.

An inductor Lr has one side is connected to node A and its other side connected to one end of the primary winding 34 of a power transformer T1 at node B. The other end of the primary winding 34 of the power transformer T1 is connected to node E. Two clamping diodes Dc1 and Dc2, if needed, are connected in series at node B and between the DC input terminals Vin+ and Vin−.

In operation, the leading full-bridge inverter 12 has two current paths 36 and 38. The first current path 36 includes power switches Q1 and Q4, inductor Lr, and the primary winding 34 of the transformer T1. The second current path 38 includes power switches Q2 and Q3, the inductor Lr, and the primary winding 34 of the transformer T1. Current in the first and second current paths 36 and 38 is established by the control signals from the master phase-shift controller 16 which are applied to the gates of the power switches Q1-Q4, in a manner described below in detail, to develop a first AC output voltage across the primary winding of the transformer T1.

Similarly, the lagging full-bridge inverter 14 has a pair of MOSFET power switches Q5 and Q6 connected in series at node AA between the DC input terminals Vin+ and Vin−. In a similar manner, the lagging full-bridge inverter 14 also has a pair of MOSFET power switches Q7 and Q8 cascaded together at node EE in series between the DC input terminals Vin+ and Vin−.

The diodes Dq5 and Dq6 are the body diodes of power switches Q5 and Q6, respectively. The capacitive elements Cq5 and Cq6, whose values include the parasitic capacitances of the power switches Q5 and Q6 and external capacitances, if any, are connected across the power switches Q5 and Q6, respectively. Likewise, the diodes Dq7 and Dq8 are the body diodes of the power switches Q7 and Q8, respectively, and the capacitive elements Cq7 and Cq8 have values which include the parasitic capacitance of power switches Q7 and Q8, as well as any external capacitances that are connected across the power switches Q7 and Q8. One end of the primary winding 40 of a power transformer T2 is connected to node EE.

In operation, the lagging full-bridge inverter 14 also has two current paths 42 and 44, the third current path 42 including the power switches Q5 and Q8 and the primary winding 40 of transformer T2. The fourth current path 44 includes power switches Q6 and Q7 and the primary winding 40 of the transformer T2. Current in the third and fourth current paths 42 and 44 is also established by the control signals applied to the gates of the power switches Q5-Q8, in a manner described below in detail, to develop a second AC output voltage across the primary winding of the transformer T2.

The AC voltage outputs developed on the primary windings 34 and 40 of transformers T1 and T2 of from the leading and lagging full-bridge inverters 12 and 14 are transferred to respective transformer secondary windings 50 and 52, in the full-wave rectifier circuits 56 and 58, the inductive paths being illustrated by dotted line paths 26 and 28. The full-wave rectifier circuits 56 and 58 rectify and combine the respective AC output voltages from the leading and lagging full-bridge inverters 12 and 14 to produce rectified output signals on the respective output lines 60 and 62 at respective nodes F1 and F2. It should be noted that the rectified output signals are pulse-width modulated (PWM) signals that result from the phase-shifted control signals from the master and slave phase-shift controllers 16 and 18, described below in greater detail.

More particularly, the voltage developed by the secondary windings 50 and 52 of the transformers T1 and T2 provide the input to the respective full-wave rectification circuits 56 and 58. Each of the secondary windings 56 and 58 have the same turn ratio, and have center taps connected to a secondary stage reference potential, GNDS, which may be an earth ground, and to which the negative DC output voltage, Vo−, is also connected.

The two transformer output terminals, M1 and M2, which preferably have a same reference polarity, are fed to the full-wave rectifier circuit 56 formed by the rectifier diodes Ds1 and Ds3 and the free-wheeling diode Ds5. The cathodes of the rectifier diodes Ds1 and Ds3 and of the free-wheeling diode Ds5 are connected together at node F1.

Similarly, the two transformer output terminals, N1 and N2, which also preferably have a same reference polarity, are fed to the full-wave rectifier circuit 58 formed by the rectifier diodes Ds2 and Ds4 and the free-wheel diode Ds6. The cathodes of the rectifying diodes Ds2 and Ds4 and of the free-wheeling diode Ds6 are connected together at node F2. The anodes of the free-wheel diodes Ds5 and De6 are connected to the secondary stage reference potential, or ground, GNDS.

The rectified output voltages on output lines 60 and 62 are connected to a current doubling output filter circuit 66, where they are filtered and delivered on an DC output voltage lines 70, Vo+, and 72, Vo−, as a DC output voltage, Vo. The current doubling output filter circuit 66 has two output inductors Lo1 and Lo2 connected to the DC voltage output terminal, Vo+, at one end, and to the nodes F1 and F2 at their other ends, respectively.

An output bulk capacitor, Co, is connected between the DC voltage output terminals Vo+ and Vo−. It is noted that the output Vo− is derived from the center-tap of the secondary windings 50 and 52 of transformers T1 and T2; thus, it should be appreciated that the full-wave bridge circuits 12 and 14 may be simultaneously supplying power to the full-wave rectifier circuits 56 and 58 and current doubling output filter circuit 66. Additional details of the construction and operation of the full-wave rectifier circuit 56 and current doubling output filter circuit 66 are set forth in parent copending U.S. patent application Ser. No. 12/315,166 filed Nov. 28, 2008, cited above.

The voltage, Vo, on the DC output voltage lines 70 and 72 of the current doubling output filter circuit 66 is sensed and fed back to respective master and slave phase-shift controllers 16 and 18 to provide control signals to the respective gates of the power switches Q1-Q4 and Q5-Q8. The control signals provided by the phase-shift controllers 16 and 18 are operated only in phase-shift mode, without a PWM control signal requirement. The master and slave phase-shift controllers 16 and 18 may be, for example, BiCMOS Advanced Phase-Shift PWM Controllers, circuits made and sold by the assignee, Texas Instruments Incorporated, under part number UCC2895, described in datasheet SLUS1570, dated December, 1999, and revised April, 2010, said datasheet being incorporated herein by reference in its entirety. The phase shift controllers 16 and 18 may be connected in a manner shown in FIG. 3. As mentioned above, although two phase-shift controllers 16 and 18 are shown for illustration, the functions of the master and slave phase-shift controllers may be combined into a single circuit, for example, an integrated circuit (not shown), or the like.

Figure 4:
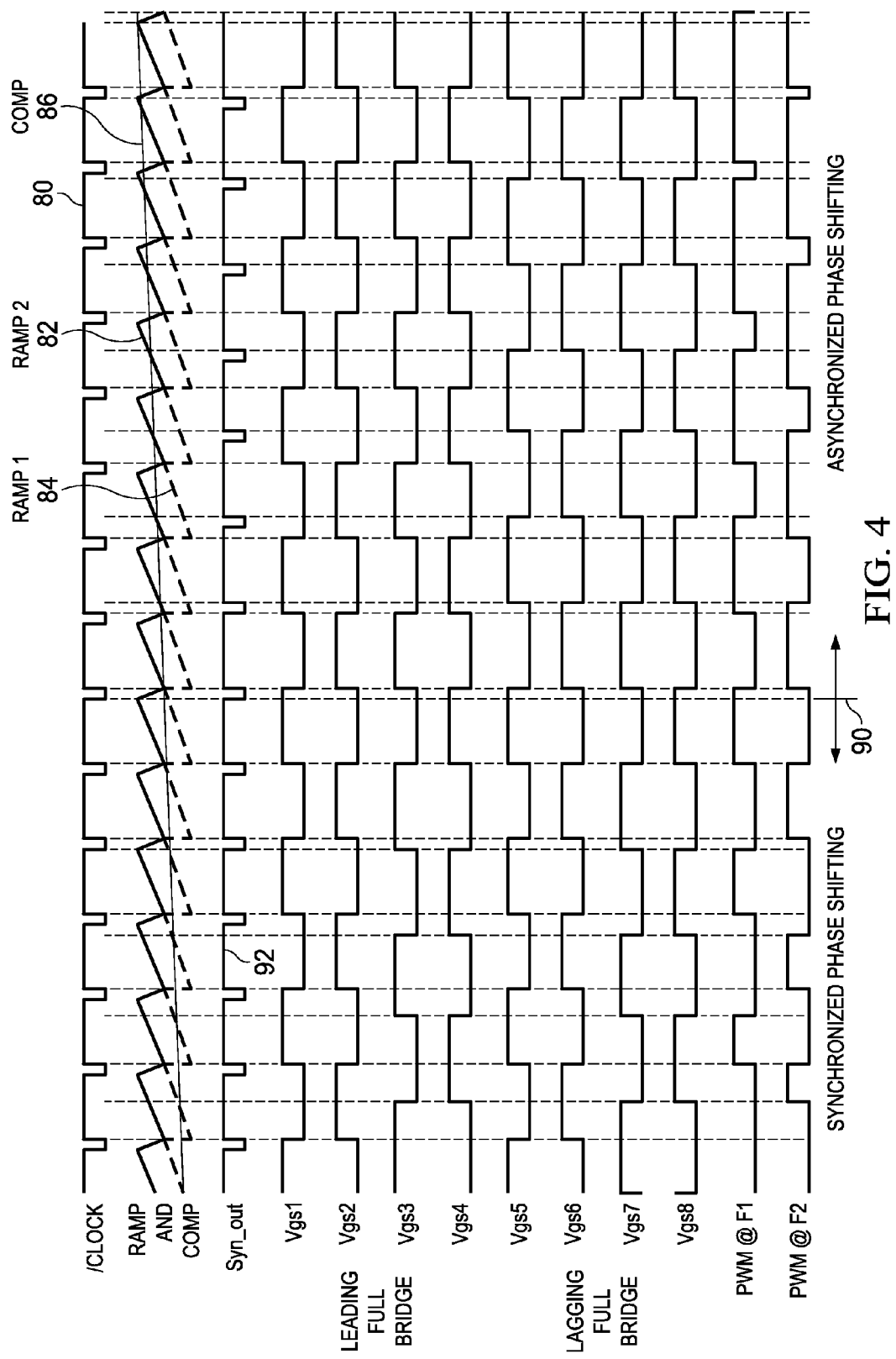
FIG. 4 is a signal timing diagram of the control signals of the leading and lagging phase-shift controllers and the rectified PWM signals of the double phase-shifting full-bridge DC-to-DC converter of FIGS. 1 and 2.

Typical waveforms of the double phase-shifting full-bridge DC-to-DC converter 10 of FIG. 1 are shown in FIG. 4, to which reference is now additionally made. The master phase-shift controller 16 is driven by a clock signal, /Clock, 90 to produce two ramp signals, Ramp1, 82 and Ramp2, 84. The slave phase-shift controller 18 is driven by the Syn out signal 92 of the master phase-shift controller 16 to produce its own Ramp1 and Ramp2 signals (waveforms not shown). The comparison signal, Comp, 86 is the output of the loop compensator 94 with the feedback voltage, Vo, sensed at the output of the current doubling output filter circuit 66. The signal, Comp, 86, is used for comparison to the voltages of the ramp signal, Ramp1, 84 to generate Vgs3 and Vgs4, and the clock signal, /Clock, 90 is used to generate Vgs1 and Vgs2. The gate control signals Vgs1-Vgs4 on lines 20 are connected to the gates of power switches Q1-Q4, and the gate control signals Vgs5-Vgs8 on line 22 are connected to the gates of power switches Q5-Q8. Additional details of the development of the ramp and comparison signals 82, 84, are described in greater detail in parent copending U.S. patent application Ser. No. 12/315,166 filed Nov. 28, 2008, cited above The ramp signals, Ramp1, 82 and Ramp2, 84 have a triangle waveform which are fed to comparators in the master and slave phase-shift controllers 16 and 18 to generate the phase-shifted control signals to control the currents in the first 36, second 38, third 42, and fourth 44 current paths. Thus, the master phase-shift controller 16 generates first and second gate control signal sets Vgs1-Vgs2, and Vgs3-Vgs4, as shown, and the slave phase-shift controller 18 generates third and fourth gate control signal sets Vgs5-Vgs6, and Vgs7-Vgs8, as shown, the respective control signal sets having a control signal and an inverse thereof.

In addition to enabling the leading and lagging full-bridge inverters 12 and 14 to produce their AC output voltages from which the DC output voltage, Vo, is derived, the phase-shift controllers 16 and 18 serve as well to regulate the DC output voltage, Vo, by changing a phase of the second and fourth sets of control signal sets with respect to the first and third sets of control signals when the DC output voltage is below a predetermined level, and by changing a phase of the third and fourth sets of control signals with respect to the first and second sets of control signals when the DC output voltage is above the predetermined threshold.

Figure 3:
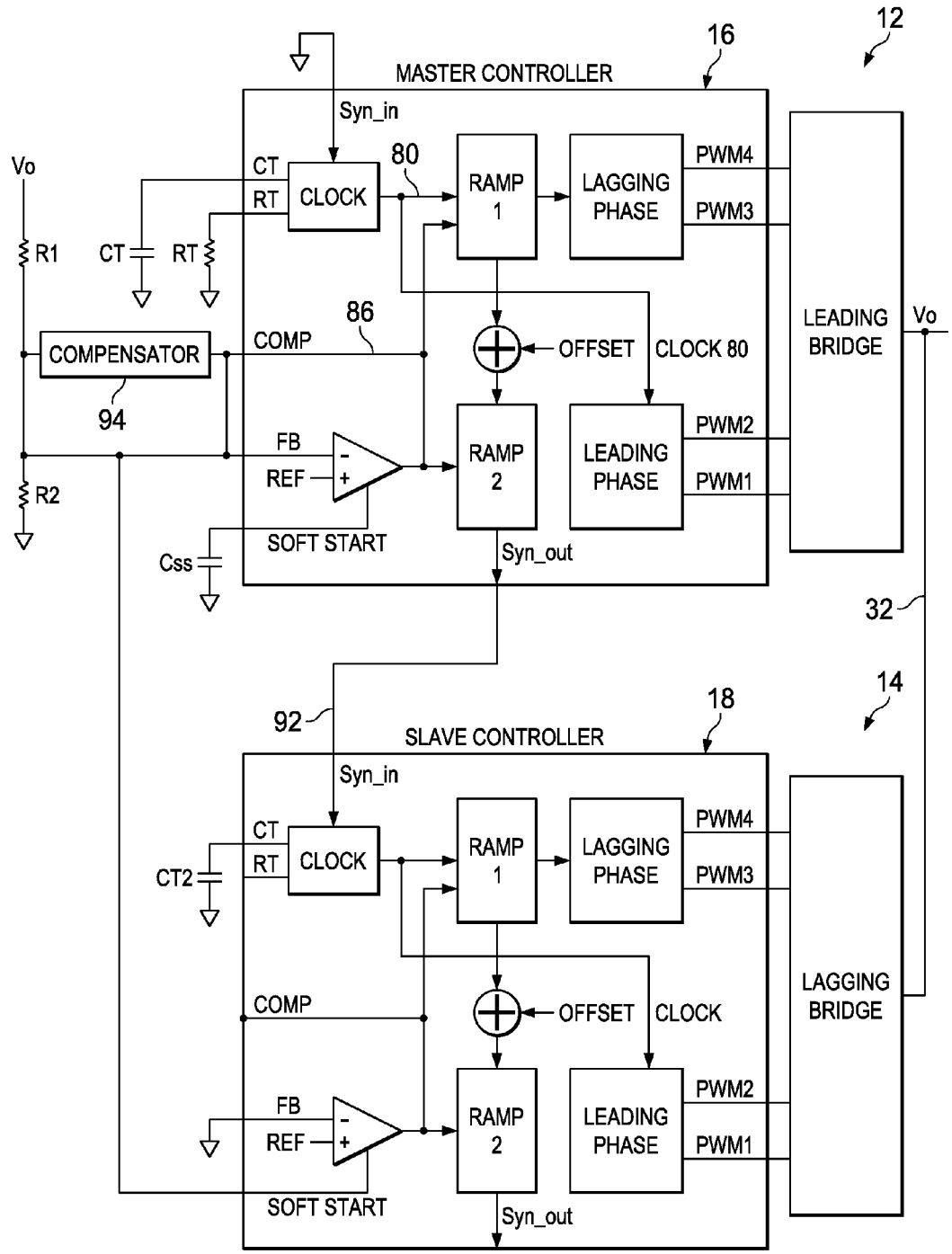
FIG. 3 is a block diagram of a controller embodiment that can be used to accomplish a master/slave phase-shift controller relationship for phase interleaving control signals to the leading and lagging full-bridge inverters of FIGS. 1 and 2.

Both the master phase-shift controller 16 and the slave phase-shift controller 18 can shift their own phases from 0 to 180 degrees, and the master phase-shift controller 16 outputs a zero degree interleave (synchronous) signal, Syn_out, 92 to the slave phase-shift controller 18 in a manner illustrated in FIG. 3. When their phases reach 180 degrees, the master phase-shift controller 16 starts increasing the interleaving angle, which forces the all four gate signals to the slave phase-shift controller 18 to move, as shown in a synchronized phase-shifting section of FIG. 4, described below in greater detail.

It can be seen that an effective PWM duty cycle is achieved without actual PWM control signal operation, and the output voltage, Vo, is regulated when the phases move. Thus, the phase-shift controllers 16 and 18 regulate the DC output only by controlling respective phases of the gate control signals Vgs1-Vgs8. More particularly, when the DC output voltage, Vo, is below the predetermined threshold voltage 90 in a synchronous phase-shift mode the leading phase-shift controller 16 is configured to control a phase of the second gate control signal set Vgs3 and Vgs4 with respect to a phase of the first gate control signal set Vgs1 and Vgs2 in proportion to the DC output voltage, Vo. When the DC output voltage, Vo, is above the predetermined threshold voltage 90, in an asynchronous phase-shift mode, the leading phase-shift controller 16 is configured to maintain the phase of the second gate control signal set Vgs3 and Vgs4 to be substantially 180 degrees out of phase with the first gate control signal set Vgs1 and Vgs2, as shown. As illustrated, the first and second gate control signal sets are offset by 180 degrees in the asynchronous phase-shift mode.

Additionally, when the DC output voltage, Vo, is below the predetermined threshold voltage 90 in the synchronous phase-shift mode, the lagging phase-shift controller 18 is configured to control a phase of the third and fourth gate control signal sets Vgs5-Vgs6 and Vgs7-Vgs8 to be substantially the same as the phases of the first and second gate control signals Vgs1-Vgs2 and Vgs3-Vgs4. When the DC output voltage is above predetermined threshold voltage 90 in the asynchronous phase-shift mode, the lagging phase-shift controller 18 is configured to control a phase of said third and fourth gate control signals Vgs5-Vgs8 in proportion to the DC output voltage with respect to the respective phases of the first and second gate control signals Vgs1-Vgs4.

The result of the phase control by the leading and lagging phase-shift controllers 16 and 18 is to produce rectified output voltages at the output of the full-wave rectifier circuits 56 and 58. The rectified output voltages are PWM voltages on lines 60 and 62 at nodes F1 and F2. This is illustrated by waveforms PWM @ F1 and PWM @ F2 in FIG. 4 that are created by the various gate control signals Vgs1-Vgs8. More particularly, the waveform PWM @ F1 below the predetermined threshold voltage 90 represents Vgs1 AND Vgs8 and above the predetermined threshold voltage 90 represents Vgs1 OR Vgs8. the waveform PWM @ F2 below the predetermined threshold voltage 90 represents Vgs2 AND Vgs6 and above the predetermined threshold voltage 90 represents Vgs2 OR Vgs6. Logical combinations with the other gate control voltage sets can be drawn, as well, if desired.

In operation, when the level of the comparison signal, Comp, 86 is less than the level of the first ramp signal, Ramp1, 82, the master phase-shift controller 16 operates in synchronous phase-shift mode, shown to the left of predetermined threshold voltage line 90. In the synchronous phase-shift mode, the master phase-shift controller 16 generates gate control signals Vgs1-Vgs4 in which gate control signals Vgs3 and Vgs4 phase-shift with respect to the gate control signals Vgs1 and Vgs2 with increasing DC output voltage, Vo. At the same time, the slave phase-shift controller 18 generates gate control signals Vgs5-Vgs8 that follow the gate control signals Vgs1-Vgs4. It can be seen that in some embodiments, in the synchronous phase shift mode, at low voltages, it may be possible to turn off the slave phase-shift controller 18, since the gate control signals are substantially the same as those of the master phase-shift controller 16. As shown, in the synchronous phase-shift mode, the rectified output signals PWM @ F1 and PWM @ F2 are PWMed, as described above.

On the other hand, when the comparison signal, Comp, 66 increases to the level of the second ramp level, Ramp 2, 84, the rectified output signals, PWM @ F1 and PWM @ F2, reach their maximum 50% PWM duty cycle. As the comparison signal, Comp, 66 continues to increase, the slave phase-shift controller 18 smoothly transitions to phase-shift control mode to regulate the output voltage, Vo, in the asynchronous phase-shift mode, shown to the right of the output voltage line 90. In the asynchronous phase-shift mode, the gate control signals Vgs5-Vgs8 are no longer synchronized with gate control signals Vgs1-Vgs4, and start to shift their phases as the output voltage, Vo, increases. The effect of the phase shifting the control signals in the asynchronous phase-shift mode is an interleaving of the outputs from the full-wave bridge circuits 12 and 14, the interleaving angle depending on the phase-shift angle of the gate control signals. As shown, in the asynchronous phase-shift mode, the rectified output signals PWM @ F1 and PWM @ F2 continue to be PWMed, as described above.

In general, a phase-shifting full-bridge DC-to-DC converter reaches its optimal operating condition when its phase-shifts by 180 degrees. In this state, the converter can achieve zero-voltage-switching (ZVS), peak efficiency, and optimal utilization of all magnetic components, as described in greater detail in parent copending U.S. patent application Ser. No. 12/315,166 filed Nov. 28, 2008, cited above.

Thus, according to the embodiment of the double phase-shifting full-bridge DC-to-DC converter 10 illustrated in FIG. 1, the leading and lagging full-bridge circuits 12 and 14 are connected in an interleaving fashion so that each of the leading and lagging full-bridge circuits 12 and 14 operates in a phase-shift mode that can operate with up to a 180 degree phase-shift, whereby the DC output voltage, Vo, can be effectively regulated by the combination of phase-shifting and interleaving angle changing.

Over a wide load range (above 5% of full load typically), the leading and lagging full-bridge circuits 12 and 14 can operate at optimal conditions, namely bus converter mode, and the output voltage relies on the interleaving angle for regulation, essentially eliminating the need for PWM gate control signals. Furthermore, when the load is lower than a certain value, or the output voltage is desired to be regulated below 50% of its maximum value, the interleaving angle decreases to zero and each of the leading and lagging full-bridge circuits 12 and 14 starts its own phase-shifting from 180 degrees. For loads below about 5%, since each of the leading and lagging full-bridge circuits 12 and 14 still operate with a large phase-shifting angle, soft switching to lighter loads can be maintained. As mentioned, in some embodiments, one of the full-bridge circuits can be turned off completely to save switching loss and improve light load efficiency.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. An electronic DC-to-DC converter, comprising:
an inverter circuit consisting of a first full-bridge inverter having first and second current paths for producing a first AC output voltage in response to a DC input voltage; and
a second full-bridge inverter having third and fourth current paths for producing a second AC output voltage in response to said DC input voltage; further comprising
a full-wave rectifier circuit to receive said first and second AC output voltages to produce first and second rectified output voltage;
a current doubling output filter circuit to receive said first and second rectified output voltage in parallel and combine them to produce a DC output voltage such that there are substantially no circulating currents in primary windings of the first and second inverters;
a first phase-shift controller for receiving said DC output voltage for providing first control signals to said first current path and providing second control signals to said second current path;
a second phase-shift controller for receiving said DC output voltage for providing third control signals to said third current path and providing fourth control signals to said fourth current path;
wherein to regulate said DC output voltage:
when said DC output voltage is below a predetermined threshold voltage said first phase-shift controller controls a phase of said second control signals with respect to a phase of said first control signals in proportion to said DC output voltage;
when said DC output voltage is above said predetermined threshold voltage said first phase-shift controller maintains said second phase to be substantially 180 degrees out of phase with said first phase;
when said DC output voltage is below said predetermined threshold voltage said second phase-shift controller controls a phase of said third and fourth control signals to be substantially the same as said first and second phases; and
and when said DC output voltage is above said predetermined threshold voltage said second phase-shift controller controls a phase of said third and fourth control signals in proportion to said DC output voltage with respect to said first and second phases.

2. The DC-to-DC converter of claim 1 wherein said predetermined threshold voltage is a voltage at which said rectified output voltage from said full-wave rectifier circuit has a PWM duty cycle of about 50%.

3. The DC-to-DC converter of claim 1 wherein said first and second phase-shift controllers are constructed in a combined circuit.

4. The DC-to-DC converter of claim 1 wherein said first and second full-bridge inverters are coupled to said full-wave rectifier circuit by transformers having secondary windings with a center tap, and wherein said current doubling output filter circuit is connected between said center taps and respective ends of said transformers.

5. The DC-to-DC converter of claim 1 wherein said second full-bridge inverter can be turned off at loads less than about 5% of a maximum load value.

6. The DC-to-DC converter of claim 1 wherein said first and second rectified output voltages are PWM signals.

7. The DC-to-DC converter of claim 6 wherein each of said first and second phase-shift controllers can vary a duty cycle of said PWM signals from 0 degrees to 180 degrees.

8. The DC-to-DC converter of claim 1 wherein said first and second full-bridge inverters comprise MOSFET power switches, and wherein said first, second, third, and fourth control signals are control signal sets to control gates of said MOSFET power switches.

9. The DC-to-DC converter of claim 8 wherein said first and second phase-shift controllers are configured wherein said first, second, third, and fourth control signals provide zero voltage switching of said MOSFET power switches.

10. An electronic DC-to-DC converter, comprising:
an inverter circuit consisting of a leading full-bridge inverter and a lagging full-bridge inverter for receiving a DC input and producing respective AC output voltages; further comprising
a full-wave rectifier circuit for rectifying said AC output voltages to produce first and second rectified output voltages;
a current doubling output filter to receive in parallel and filter said first and second rectified output voltages to produce a DC output voltage such that there are substantially no circulating currents in primary windings of the leading and lagging inverters;
a master phase-shift controller and a slave phase-shift controller respectively providing first and second control signals to said leading full-bridge inverter and third and fourth control signals to said lagging full-bridge inverter;
wherein said master and slave phase-shift controllers regulate said DC output voltage only by changing a phase of said second and fourth control signals with respect to said first and third control signals below a predetermined DC output voltage, and by changing a phase of said third and fourth control signals with respect to said first and second control signals above a predetermined threshold.

11. The DC-to-DC converter of claim 10 wherein said leading and lagging full-bridge inverters comprise MOSFET power switches, and wherein said master and slave phase-shift controllers provide gate control signals to control said MOSFET power switches having variable respective phases dependent on said DC output voltage.

12. The DC-to-DC converter of claim 10 wherein each of said leading and lagging full-bridge inverters comprises four MOSFET power switches and a primary winding of a transformer to define two current paths with current flowing in each direction in said primary winding.

13. The DC-to-DC converter of claim 10 wherein said rectified output voltages are PWM signals.

14. The DC-to-DC converter of claim 10 wherein said master and slave phase-shift controllers are constructed in a combined circuit.

15. The DC-to-DC converter of claim 10 wherein said predetermined DC output voltage is a voltage at which a duty cycle of said rectified output voltage is about 50%.

16. The DC-to-DC converter of claim 10 wherein said control signals of said master and slave phase-shift controllers are signal sets.

17. An electronic DC-to-DC converter, comprising:
an inverter circuit consisting of first and second full-bridge inverters for receiving a DC input; further comprising
a full-wave rectifier circuit and filter circuit for receiving in parallel and combining outputs of said first and second full-bridge inverters to produce a DC output voltage;
a phase-shift controller for providing control signals to said first and second full-wave inverters with respective phases dependent upon the DC output voltage such that there are substantially no circulating currents in primary windings of the first and second inverters ;
wherein said phase-shift controller regulates said DC output voltage only by controlling respective phases of said control signals across a full operating range of said DC-to-DC converter.

18. The DC-to-DC converter of claim 17 wherein said full-wave rectifier circuit has an output that is a PWM signal having a duty cycle controlled by said phase-shift controller.

19. The DC-to-DC converter of claim 17 wherein said phase-shift converter comprises a master phase-shift converter providing first and second control signals and a slave phase-shift converter providing third and fourth control signals.

20. The DC-to-DC converter of claim 19, wherein to regulate said DC output voltage:
when said DC output voltage is below a predetermined threshold voltage said first phase-shift controller controls a phase of said second control signals with respect to a phase of said first control signals in proportion to said DC output voltage;
when said DC output voltage is above said predetermined threshold voltage said first phase-shift controller maintains said second phase to be substantially 180 degrees out of phase from said first phase;
when said DC output voltage is below said predetermined threshold voltage said second phase-shift controller controls a phase of said third and fourth control signals to be substantially the same as said first and second phases; and
and when said DC output voltage is above said predetermined threshold voltage said second phase-shift controller controls a phase of said third and fourth control signals in proportion to said DC output voltage with respect to said first and second phases.

* * * * *